United States Patent

[11] 3,545,815

| [72] | Inventor | Arthur A. Berg |
| | | Lincolnwood, Ill. |
| [21] | Appl. No. | 744,880 |
| [22] | Filed | July 15, 1968 |
| [45] | Patented | Dec. 8, 1970 |
| [73] | Assignee | Berg Mfg. & Sales Co. |
| | | Des Plaines, Ill. |
| | | a corporation of Illinois |

[54] TRACTOR-TRAILER BRAKE SYSTEM
3 Claims, 6 Drawing Figs.

[52] U.S. Cl. .................................. 303/7,
188/3, 303/3, 303/13, 303/15, 303/28, 303/40
[51] Int. Cl. ................................................. B60t 13/68,
B60t 13/36, B60t 7/06
[50] Field of Search.......................................... 303/2—4,
7—8, 13, 15, 17—18, 20, 28, 40; 188/3; 192/Inq.

[56] References Cited
UNITED STATES PATENTS

| 2,586,450 | 2/1952 | Whitten et al. .............. | 303/7 |
| 2,652,904 | 9/1953 | Whitten........................ | 303/7 |
| 2,693,251 | 11/1954 | Hall.............................. | 303/7X |
| 2,808,902 | 10/1957 | Williams....................... | 303/7 |
| 2,169,668 | 8/1939 | Thomas........................ | 303/7X |
| 2,185,261 | 1/1940 | Leupold ....................... | 303/18 |
| 2,260,641 | 10/1941 | Reid ............................ | 303/15X |
| 3,256,045 | 6/1966 | Stelzer......................... | 303/15 |
| 3,350,142 | 10/1967 | Schuman...................... | 303/7 |
| 3,423,135 | 1/1969 | Beltramo..................... | 303/7X |
| 3,428,368 | 2/1969 | Kobnick...................... | 303/7X |

*Primary Examiner*—Milton Buchler
*Assistant Examiner*—John J. McLaughlin, Jr.
*Attorney*—Parker, Carter & Markey

ABSTRACT: A tractor-trailer brake system including an electrical signal generator controlled by the tractor brake pedal and initiating application of trailer brakes with or before tractor brake application to reduce jackknifing tendencies of tractor and trailer, the system providing trailer braking in event of failure of either tractor pressure or the signal generator, the signal generator providing trailer brake application in proportion to the movement of the brake pedal.

INVENTOR.
Arthur A. Berg
BY Parker & Carter
Attorneys.

INVENTOR.
Arthur A. Berg
BY Parker & Carter
Attorneys.

TRACTOR-TRAILER BRAKE SYSTEM

SUMMARY OF THE INVENTION

The system of the invention includes a tractor brake system having a fluid pressure reservoir, brake actuators operated by fluid pressure such as air or hydraulic or both, an electrical energy signal generator and an application valve, a trailer system including a source of such fluid pressure, a relay valve communicating with the source and with the tractor application valve, a modulation valve supplied with pressure from the source and communicating with the relay valve, the modulation valve on the trailer and the application valve on the tractor communicating with the trailer-mounted relay valve through a two-way check valve structure whereby the relay valve may be actuated by either the modulation or application valve, the signal generator on the tractor being connected to the modulation valve on the trailer to supply activating energy to the modulation valve in proportionate response to activation of the application valve and signal generator, the signal generator taking the form of a rheostat, potentiometer, servomotor or the like to supply controlling energy incrementally with actuation of the application valve.

The invention relates to fluid pressure brake systems and particularly to fluid pressure brake systems usable on tractor-trailer combination vehicles.

One purpose of the invention is to reduce jackknifing tendency of the tractor-trailer combination vehicle by insuring against the application of trailer brakes prior to the application of tractor brakes.

Another purpose of the invention is to reduce trailer brake application time, to reduce vehicle stopping distance and to provide a greater driver control of a tractor-trailer vehicle.

A serious safety factory exists in the braking operation of a tractor-trailer combination vehicle. When the operator removes his foot from the accelerator pedal, the tractor motor immediately begins to decelerate the tractor. The operator then operates the brake pedal, further decelerating the tractor, in an effort to supply braking pressure to the tractor and the trailer. The braking pressure, however, reaches the tractor brakes between approximately two-tenths and six-tenths of a second before it reaches the trailer brakes due to the fact that the controlling air has to cover the tractor-to-trailer distance involved and to fill the volume determined by the air lines, valves, etc. of the system. Within this fraction of a second, the trailer is in effect "pushing" the tractor and conditions conducive to jackknifing may occur. Hence it is another purpose of the invention to provide means insuring application of trailer brakes before or simultaneously with the application of tractor brakes.

Another purpose is to provide a tractor-trailer brake system including fluid pressure and alternative actuating means for operating the trailer brakes, each automatically effective though the other has failed.

Another purpose is to provide a tractor-trailer brake system having alternative means effective to actuate trailer brakes, each in proportionate response to the actuation of tractor brakes.

Other purposes may appear from time to time during the course of the specification and claims.

BRIEF DESCRIPTION OF THE DRAWINGS

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
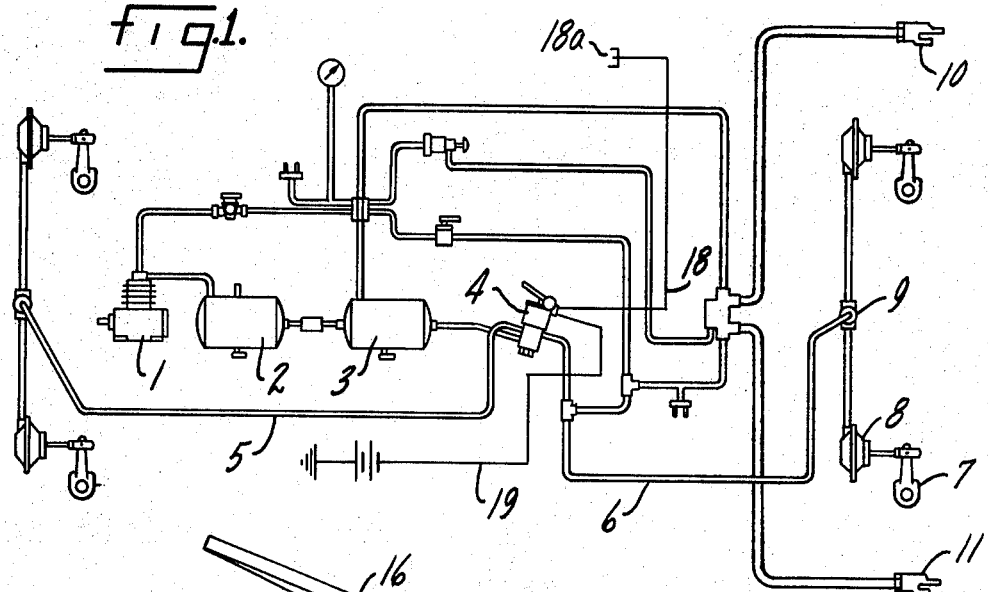
FIG. 1 illustrates a tractor brake pressure system.

Referring now to the drawings, and particularly to FIG. 1, a tractor brake pressure system is illustrated. A compressor 1 supplies fluid pressure to reservoirs 2,3. An application valve 4 controls delivery of fluid pressure from the tank 3 through conduits 5,6 to front and rear brakes, respectively, the brake slack adjusters 7, service cylinders 8 and valves 9 being shown for each of the four tractor brakes. It will be understood that the tractor brake system may take the form of a conventional hydraulic fluid pressure system having an application valve or master cylinder and hydraulic pressure brake actuators without departing from the nature and scope of the invention.

Gladhand connectors 10,11 are provided and supplied with fluid pressure through a suitable system of conduits and control valves, illustrated in FIG. 1. It will be understood by those skilled in the art that gladhand 10 is connected to the emergency line or side of the system illustrated in FIG. 1 and that gladhand 11 is connected to the service line or side of said system. Since a variety of control valves and conduit arrangements may be employed without departing from the nature and scope of the invention, specific descriptions thereof are, for clarity, eliminated herein.

Figure 2:
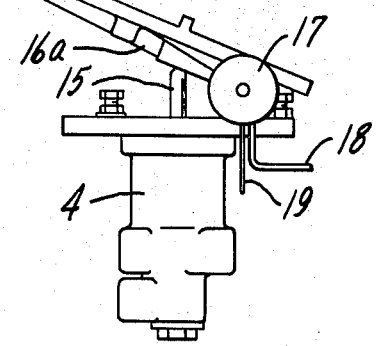
FIG. 2 is a side view on an enlarged scale of the brake pedal and application valve of FIG. 1.

Referring now to FIG. 2, it will be observed that the brake application valve 4 is actuated, through an extending shaft 15, by a pivoted brake pedal 16. An electrical potentiometer 17 is mounted adjacent valve 4 and is supplied with electrical energy through conductor 19 by the batteries or electrical system (not shown) for example of the tractor. Conductor 18 extends from potentiometer 17 to the tractor-trailer connector 18a. It will be understood that pedal 16 is suitably connected as by arm 16a to potentiometer 17 whereby movement of pedal 16 actuates potentiometer 17 to increase electrical energy delivered therethrough in response to the extent of depression of pedal 16. It will be understood that the signal generator represented by potentiometer 17 may take the form of a rheostat or a servomotor such as that shown in FIG. 5 and that other manually operable brake system actuating members in a tractor system may be supplied with electrical energy controlling elements without departing from the nature and scope of the invention. Similarly, while the signal generator 17 is shown as mounted externally to brake application member 4, it will be realized that the signal generator could be incorporated internally within the housing of application member 4 for operation in response to movement of pedal 16 without departing from the nature and scope of the invention.

Figure 3:
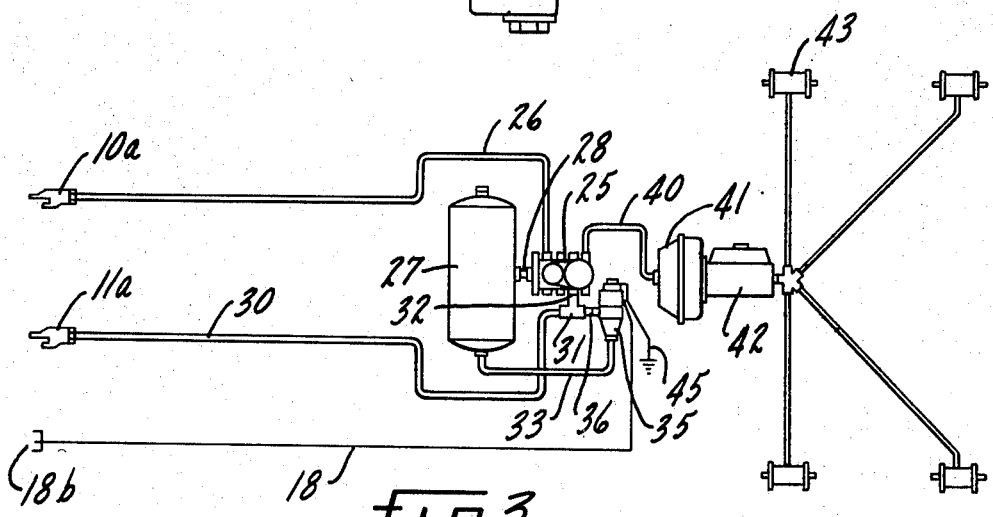
FIG. 3 is a schematic view of one form of trailer brake system in accordance with the invention.

Referring now to FIG. 3, a trailer brake system is illustrated. Gladhand connector 10a is positioned for connection with gladhand 10 of the tractor system and gladhand connector 11a is positioned for connection with service gladhand 11 of the tractor system. A relay valve 25 is communicated with gladhand connector 10a as by conduit 26. Relay valve 25 is also communicated with a fluid pressure reservoir 27 by connection 28.

A service conduit 30 communicates gladhand connector 11a with one inlet port of a two-way check valve 31. The two-way check valve 31 has an outlet communicating with relay valve 25 as indicated at 32. A conduit 33 connects reservoir 27 with an inlet port of an electrical or magnetic modulation valve 35. An outlet port of valve 35 is connected to the other inlet port of two-way check valve 31 as indicated at 36.

Relay valve 25 has an outlet port connected by a relatively short conduit 40 with an air-over-hydraulic brake chamber 41. It will be understood that brake chamber 41 is divided into an air chamber communicating with conduit 40 and a hydraulic chamber 42 filled with hydraulic fluid. The hydraulic chamber is in turn effective to deliver pressure to hydraulic brake-operating cylinders 43. As described hereinbelow, the trailer brake system could take the form of an air-operated system such as that shown in FIG. 1 for example.

Electrical conductor 18 is connected to valve structure 35, appropriate connector means 18b being provided for connection with connector 18a of the portion of conductor 18 on the tractor in the same manner as the connections of gladhands 10,10a and 11,11a. An electrical conductor 45 connects a suitable element of valve structure 35 with ground.

Figure 4:
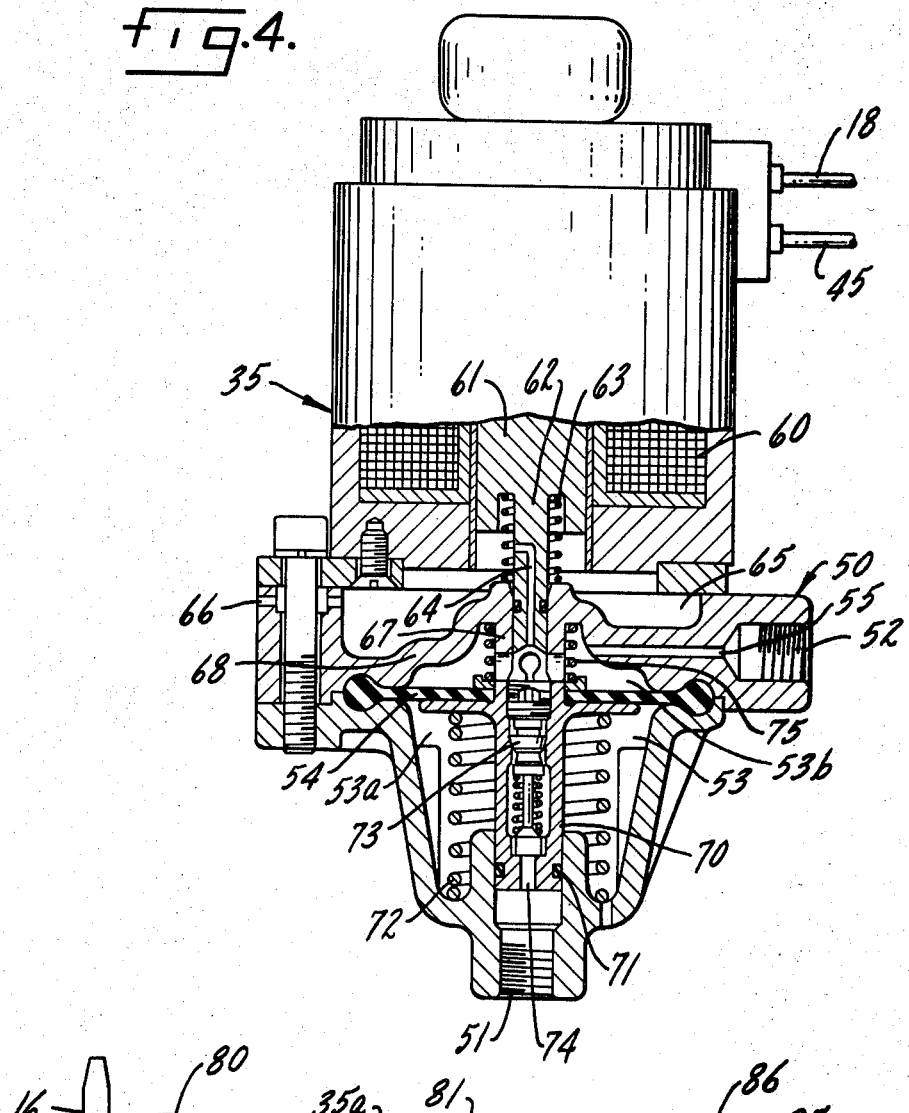
FIG. 4 is a side view in partial cross section of one form of modulation valve usable with the invention.

Referring now to FIG. 4, a modulation valve structure 35 is schematically illustrated and includes a housing generally indicated by the numeral 50. An inlet 51 is provided for communication with the reservoir 27 through conduit 33. An outlet 52 is provided for communication through conduit 36 with one inlet of the two-way check valve 31 and thus for communication with relay valve 25 through conduit 32. A chamber 53 is positioned between inlet 51 and outlet 52 and is divided into subchambers 53a,53b by a diaphragm 54. Outlet 52 communicates with subchamber 53b through passage 55.

It will be understood that valves 25, 31 and 35 may conveniently be combined within a single housing and structure to eliminate conduits and connections while retaining the communication described herein.

A solenoid 60 controls an armature 61 extending therethrough and is supplied with electrical energy by conductor 18, the grounding conductor 45 being shown schematically in FIG. 4.

Armature 61 carries an extension 62 and is urged by spring 63 upwardly within solenoid 60 as the parts are shown in the drawings.

An exhaust for chamber 53b, and thus for passage 55, outlet 52 and said inlet of check valve 31, is provided by a passage 64 formed in extension 62 and communicating with subchamber 53b and an exhaust chamber 65 which in turn communicates to atmosphere through exhaust outlet 66. Extension 62 passes in sliding and sealing engagement with and through a bushing or sleeve 67 formed in the housing web 68 dividing chamber 53b from chamber 65.

Diaphragm 54 carries and is movable with an elongated piston element 70 which is in turn in slidable sealing engagement with a bushing or sleeve 71 carried by housing 50 in axial alignment and communicating with inlet 51. A spring 72 urges diaphragm 54 and member 70 upwardly, as the parts are shown in the drawings. Suitable valve mechanism 73 is movable within and to control a passage 74 formed through the member 70 and thus to control communication of inlet 51 with subchamber 53b and thus with outlet 52. It will be observed that a spring 75 is positioned in subchamber 53b and urges diaphragm 54 downwardly, as the parts are shown in the drawings. Similarly, it will be observed that extension 62 is positioned for operation of the valve mechanism indicated generally at 73.

It will be understood that the particular form and operating details of the valve illustrated in FIG. 4 are merely suggested, forming no part of the present invention. Any conventional modulation valve may be employed with the solenoid 60 and armature 61 for operation thereof. Hence the valve of FIG. 4 will, for clarity, not be further described in detail herein.

Figure 5:
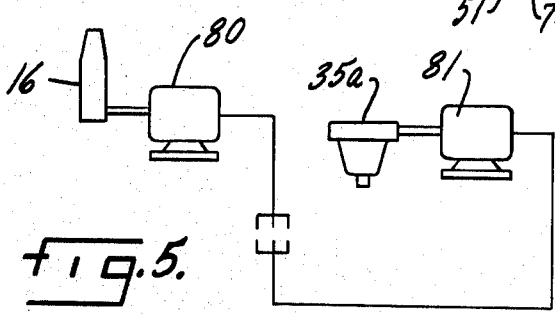
FIG. 5 is a detail view of a variant element of the invention.

Referring to FIG. 5, the servomotor 80 is shown as operable in response to movement of pedal 16 and connected to servomotor 81 for activation of valve structure 35a.

Figure 6:
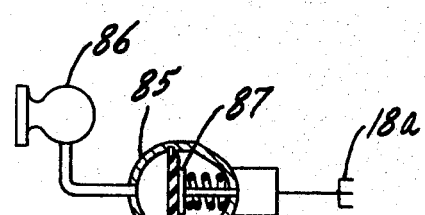
FIG. 6 is a detail view of another variant element.

Illustrated in FIG. 6 is a pressure-sensitive member 85 responsive to pressure variances in engine manifold 86 to provide activating electrical energy through means 87 to an electrically-operated modulation valve such as that shown schematically at 35 or 35a for example.

As shown in FIGS. 1 and 6, the electrical signals generated by means 87 and 17 are directed to the trailer through connector 18a. Therefore, when means 87 is generating a signal for trailer brake application, pedal 16 operation does not increase trailer braking until the signal from generator 17 exceeds the signal from means 87.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

When the operator or vehicle driver actuates brake pedal 16 to depress shaft 15 and open application valve 4, fluid pressure is supplied through conduits 5,6 to the tractor brakes associated with each of the slack adjusters 7 in the normal manner.

As brake pedal 16 is depressed, however, the arm 16a attached thereto is effective to activate potentiometer 17 and thus to supply electrical energy through conductor 18 to the modulation valve 35. Pedal 16, arm 16a, potentiometer 17 and shaft 15 may be so interrelated that initial movement of pedal 16 and arm 16a opens potentiometer 17 to supply electrical energy to valve 35 slightly before shaft 15 is actuated to provide application of tractor brakes. In any event, as pedal 16 is increasingly depressed, the arm 16a immediately increases, in proportion to the extent of depression of pedal 16, the energy supplied through potentiometer 17 and conductor 18 to valve member 35 thus increasing trailer brake application as tractor brake application increases.

Upon supply of electrical energy to member 35, the solenoid 60 is activated to drive armature 61 and extension 62 downwardly, as the parts are shown in the drawings, to open valve assembly 73 and to provide communication between inlet 51 and outlet 52. Fluid pressure thus supplied to inlet 51 through conduit 33 from tank 27 is delivered to the two-way check valve 31 and through branch conduit 32 to actuate relay valve 25 for delivery of fluid pressure through conduit 40. Air pressure may thus be supplied to the air side of the air-over-hydraulic brake chamber 41. The air pressure thus delivered is transmitted to the hydraulic fluid on the opposite side of member 41 and the resultant hydraulic pressure is delivered through means 42 and actuating cylinders 43 to apply the brakes of the trailer before or simultaneously with the application of brakes to the tractor.

The system of the invention is equally effective as in a "snubbing" brake application for example, or when the operator applies full tractor brakes in an emergency or "crash" situation, the potentiometer 17 insuring the desired relationship of tractor and trailer brake pressures throughout the range of brake pressures or range of movement of pedal 16.

Thus the speed of electrical transmission is employed in conjunction with the power available in an air pressure system to provide action of the trailer brakes prior to or simultaneously with the application of tractor brakes. While the relatively short lines involved in the trailer brake system assist in speeding brake action, the provision of air-over-hydraulic chamber 41 further speeds the application of the trailer brakes since hydraulic fluid is present within and fills the lines of the trailer brakes system beyond chamber 41 and the air pressure delivered from relay emergency valve 25 has only to travel through the relatively short conduit 40 before its full effect is exerted, thus taking full advantage of the speed provided by electrical operation of valve 35.

It will be understood that advantages of the invention can be realized whether the trailer brake system be of the air, air-over-hydraulic or hydraulic type, the latter two types increasing further the speed of brake application and facilitating employment of antiskid devices.

Should fluid pressure fail in tractor reservoirs 2,3, the signal generator 17 or servomotor 80 will nonetheless respond to movement of brake pedal 16 to supply fluid pressure from trailer reservoir 27 for application of the trailer brakes. Similarly, should there occur a failure in generator 17, servomotors 80,81 or in the electrical system generally, the application valve 4 will nonetheless deliver actuating fluid pressure to relay valve 25 in the normal manner. In the latter event, the prior or simultaneous trailer brake application advantage will be lost, but the normal braking action of tractor and trailer will remain. Thus the alternative fluid pressure and electrical trailer brake actuating systems are independent of and each remains unaffected by a failure of the other.

With reference to the assembly illustrated in FIG. 6, the deceleration of the tractor internal combustion engine produces a pressure variance within the engine manifold 86. Thus, when the vehicle operator removes his foot from the accelerator, the compression within the engine tends to slow the tractor, yet the trailer will continue its momentum and ten to "push" the tractor. The pressure-responsive member 85, however, will sense the pressure change in manifold 86 and will produce a signal activating valve structure 35 to apply the trailer brakes. It will be understood that the signal thus provided will be limited to limit the amount of trailer brakes applied to an amount substantially equaling the vehicle-decelerating effect of the engine compression and that the transmission of the signal to valve structure 35 will be essentially concurrent with said vehicle deceleration. Should the operator then elect to apply the trailer brakes, the movement of pedal 16 will produce operation of the signal generator 17 to supply activating energy to valve structure 35 in consonance with the extent of movement of pedal 16, thus applying an amount of trailer braking action corresponding substantially to that applied to the tractor and at a time either simultaneously with or prior to the tractor brake application.

I claim:

1. In a tractor-trailer fluid pressure brake system, a tractor brake system including a source of fluid pressure on the tractor, an application valve on the tractor, a foot pedal actuator on the tractor for said application valve, and tractor brake-actuating chambers, a trailer brake system including a source of fluid pressure on the trailer, trailer brake-actuating chambers, a relay valve controlling communication between said trailer source and said trailer chambers, and an electrically-operated valve in said trailer system and operable to cause delivery of fluid pressure from said trailer source to said relay valve to open said relay valve for delivery of fluid pressure from said trailer source to said trailer chambers, said application valve being operable to cause delivery of fluid pressure to said tractor chambers and said relay valve, a source of electrical energy on said tractor, a connection between said electrical energy source and said electrically-operated valve, an electrical signal generator in said connection and mounted for actuation proportionately in response to movement of said foot pedal actuator, said generator operating to direct said electrical signal to the electrically-operated valve independently of and prior to delivery of fluid pressure from said application valve to said tractor chambers and said relay valve.

2. The structure of claim 1 wherein said signal generator comprises a potentiometer mounted for actuating engagement by said foot pedal.

3. The structure of claim 1 characterized by and including an internal combustion engine on said tractor, a second signal generator on said tractor and in said connection, said second signal generator being responsive to deceleration of said engine to deliver an electrical signal to said electrically-operated valve independently of the operation of said foot pedal actuator and said application valve.